March 10, 1953 | P. S. CHRISTALDI | 2,631,200

GAIN CONTROL CIRCUIT

Filed Sept. 23, 1950

INVENTOR.
PETER S. CHRISTALDI
BY Darby & Darby
ATTORNEYS

Patented Mar. 10, 1953 2,631,200

UNITED STATES PATENT OFFICE 2,631,200

GAIN CONTROL CIRCUIT

Peter S. Christaldi, Upper Montclair, N. J., assignor to Allen B. Du Mont Laboratories, Inc., Clifton, N. J., a corporation of Delaware Application September 23, 1950, Serial No. 186,478

3 Claims. (Cl. 179—171)

The present invention relates to a new and improved gain control circuit for use with a balanced and stabilized direct current amplifier. It is particularly useful in connection with a deflection amplifier for cathode ray oscillographs, such as the one described in copending application Serial No. 186,475 of Meyer Maron, entitled "Circuit for Cathode Ray Oscillograph," filed concurrently herewith and assigned to the same assignee as the present application.

Direct current amplifiers are used in cathode ray oscillographs to produce changes in the position of the trace of the cathode ray beam in accordance with changes in the direct current level of the applied signal, while at the same time producing amplification of that signal so as to permit the indication of relatively weak signals. Both direct current and very low frequency phenomena, or phenomena combining a direct current component and a varying or alternating component, are best reproduced by the use of this type of amplifier.

Heretofore a difficulty which has existed in direct current amplifiers suitable for use in cathode ray oscillographs has been that a variation in gain has produced a change in the zero level or base line of the indicated trace. This, of course, is highly objectional since it destroys the accuracy of indication or else requires resetting the zero level each time the amplifier gain is varied or adjusted.

According to the present invention, a gain control is provided for such amplifiers which makes possible desired variations in the signal level applied to the cathode ray tube without changing the direct current or reference level. In addition, the effect of variations in the plate or heater potentials applied to the vacuum tubes of the amplifier are minimized.

Figure 1:
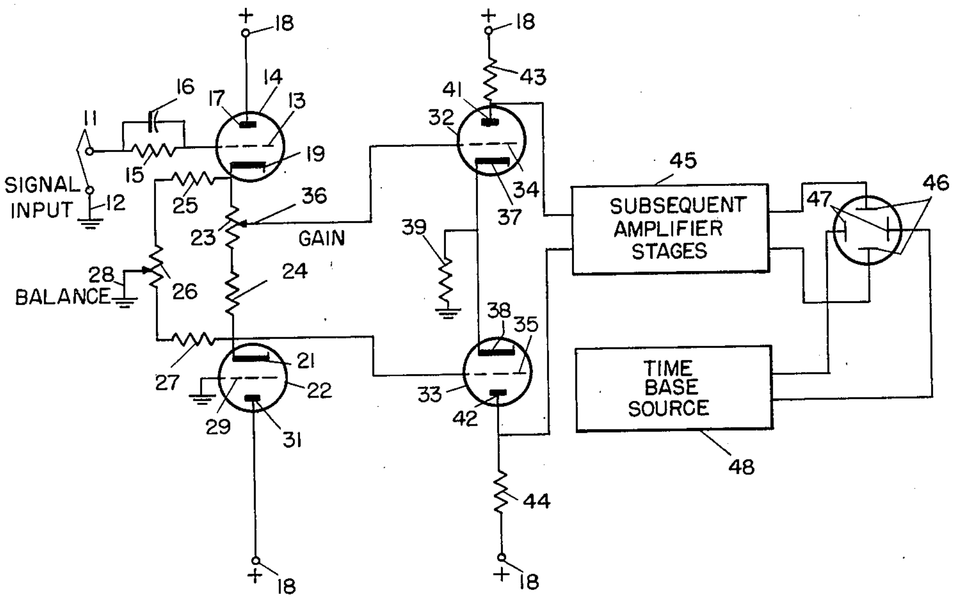
Figure 1A:
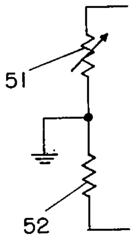

This and other objects and advantages of the present invention will become more apparent from consideration of the following description, taken in conjunction with the appended drawing in which Figure 1 is a schematic circuit diagram partially in the block diagram form of a preferred embodiment of the invention and Figure 1A is a schematic fragmentary circuit diagram of a minor modification of one portion of Figure 1.

Referring to Figure 1, the signal which it is desired to amplify is supplied to the input terminals 11, one of which is grounded at 12 while the other is connected to the grid 13 of an electron tube 14 through a grid-current-limiting resistor 15 bypassed by a condenser 16 which improves the high frequency response of the system. It will be understood that the resistor 15 serves to prevent damage to any part of the circuit due to positive potential applied to the grid 13. Tube 14 has its anode 17 connected directly to a suitable source 18 of plate potential, the other terminal of the source being understood to be grounded. The cathode 19 of tube 14 is connected to the cathode 21 of a similar tube 22 by resistance means illustrated as a potentiometer 23 in series with a fixed resistor 24. The fixed resistor 24 merely assures that the output signal from the amplifier stage represented by tubes 14 and 22 will not diminish below a given minimum value as will be seen. However, where desired, potentiometer 23 may be used alone. Cathodes 19 and 21 are also interconnected by further resistance means illustrated by the fixed resistor 25, potentiometer 26, and fixed resistor 27. Here again it would be understood that fixed resistors 25 and 27 may be combined with and form part of the potentiometer 26 or maybe omitted. The adjustable tap 28 of potentiometer 26 is grounded as shown, and by this adjustment provides a balancing means for tubes 14 and 22, since any variation of the position of adjustable tap 28 will increase the resistance between cathode and ground of one of the tubes 14 and 22 while simultaneously reducing the resistance between the other cathode and ground. The grid 29 of tube 22 is directly grounded, while the anode 31 of tube 22 is connected to the plate supply source 18.

The subsequent amplifier stage is represented by tubes 32 and 33. The grid 35 of tube 33 is connected directly to the cathode 21 of tube 22 by a direct wire connection. The grid 34 of tube 32 is connected to the variable tap 36 of potentiometer 23. The cathodes 37 and 38 of tubes 32 and 33 are connected together and to a joint cathode resistor 39 whose other terminal is connected to ground. The anodes 41 and 42 of tubes 32 and 33 are connected to the plate supply source 18 through respective plate load resistors 43 and 44.

The output from the stage 32, 33 is taken directly from anodes 41, 42 and is supplied to subsequent balanced amplifier stages illustrated by the rectangle 45. The output of these stages is then supplied to one pair of deflecting plates 46 of the cathode ray tube, illustrated in this instance as the vertical plates, although either the vertical or horizontal plates can be used as desired. In the present illustration the horizontal deflecting plates 47 are suitably excited by any desired potentials; for example, those derived from a time base source 48.

In operation, without signal input the balance adjustment 28 is varied until cathodes 19 and 21 are at the same potential. This circuit for balancing is described and claimed in the copending application of Meyer Maron, Serial No. 186,473, entitled "D. C. Balance Adjustment," filed concurrently herewith and assigned to the same assignee as the present invention. Since the cathodes 19 and 21 are thus at the same potential, the grids 35 and 34 are also at the same potential no matter where the variable tap 36 of the gain control potentiometer 23 may be set.

When the signal to be indicated or measured is supplied to the input terminal 11, 12, it will of course vary the current through tube 14 and will change the voltage between cathode 19 and the grounded tap 28. This same signal is also applied across the combination of potentiometer 23, resistors 24 and 27 and the portion of the potentiometer 26 between cathode 21 and the grounded tap 28. Therefore, a portion of this signal will appear between cathode 21 and grounded grid 29 of tube 22. The signal thus applied between grid and cathode of tube 22 is therefore of opposite polarity to that applied to tube 14.

By adjusting the tap 36 of the gain control 23, the amount of the signal difference between grids 34 and 35 can be varied as desired, thereby varying the gain of the entire amplifier. However, this adjustment does not alter the D. C. level which remains fixed as indicated above.

It will be understood that the balancing control 28 can serve to compensate for any differences in the characteristics of tubes 14 and 22 or may be used to adjust the zero level of the indication when desired, as indicated in more detail in the above mentioned copending application Serial No. 186,473, entitled "D. C. Balance Adjustment."

Figure 1A shows a resistance arrangement which can be used in place of potentiometer 26. It comprises series connected resistors 51 and 52 with their junction grounded, just as tap 28 of potentiometer 26 is grounded. One or both of resistors 51, 52 is made adjustable, so as to vary the cathode resistance of one or both tubes 14 and 22. Obviously, this produces the same adjustability as potentiometer 26.

Although the invention has been described with respect to a single embodiment, it will be understood that variations thereof can be readily devised without departure from the principle of providing gain adjustment without change in D. C. level, so as to be within the spirit and scope of the present invention. Accordingly, the present invention is not to be considered limited by the illustrative embodiment as described but is defined solely by the appended claims.

What is claimed is:

1. A controllable-gain balanced direct current amplifier, comprising a pair of electron tubes, each having a cathode, an anode and a control electrode, said anodes being connected together and directly to a source of positive potential, means providing a resistance between each of said cathodes and ground, the resistance between at least one of said cathodes and ground being adjustable to adjust the balance of the outputs from said tubes, means for applying an input signal to the control electrode of one of said tubes, means grounding the control electrode of the other of said tubes, a potentiometer directly interconnecting said cathodes and isolated from ground, and an output circuit connected between one of said cathodes and the variable tap of said potentiometer, being adjustable to vary the gain of said amplifier without affecting the direct current level.

2. A balanced adjustable-gain direct current amplifier comprising a pair of electron tubes, each having a cathode, a control electrode and an anode, said anodes being connected together and to a source of positive potential, balancing means connected to said cathodes and comprising adjustable resistance means between each of said cathodes and ground, means for applying an input signal to one of said control electrodes, the other of said control electrodes being grounded, and further resistance means also directly interconnecting said cathodes for transferring signal potentials directly from one of said cathodes to the other independently of said first resistance means, said further resistance means consisting of a potentiometer having a variable tap, the output from said amplifier being derived from the variable tap of said potentiometer and one of said cathodes, whereby the amplitude of the output signal may be varied by adjustment of said potentiometer without affecting the balance of said amplifier.

3. An adjustable-gain direct current amplifier, comprising a pair of electron tubes, each having a cathode, a control electrode and an anode, said anodes being coupled together and to a source of positive potential having a grounded negative terminal, means for applying an input signal to one of said control electrodes, the other of said control electrodes being grounded, balancing means comprising means providing a resistance between each of said cathodes and ground, the resistance between at least one of said cathodes and ground being adjustable to adjust the balance of the outputs from said tubes, and resistance means for transferring signal potentials directly from one of said cathodes to the other comprising a potentiometer directly interconnecting said cathodes and isolated from ground, and an output circuit coupled between the variable tap of said potentiometer and one of said cathodes.

PETER S. CHRISTALDI.

REFERENCES CITED

The following references are of record in the file of this patent:

UNITED STATES PATENTS

| Number | Name | Date |
|---|---|---|
| 2,070,071 | Strohmeyer | Feb. 9, 1937 |
| 2,208,254 | Geohegan | July 16, 1940 |
| 2,240,635 | Avins | May 6, 1941 |
| 2,310,342 | Artzt | Feb. 9, 1943 |
| 2,329,073 | Mitchell | Sept. 7, 1943 |
| 2,471,449 | Reade et al. | May 31, 1949 |

FOREIGN PATENTS

| Number | Country | Date |
|---|---|---|
| 584,191 | Great Britain | Jan. 9, 1947 |